United States Patent [19]

Matsuzaki

[11] Patent Number: 5,423,218
[45] Date of Patent: Jun. 13, 1995

[54] METHOD AND INSTRUMENT FOR MEASURING CONTACT ANGLE OF ROLLING BEARING

[75] Inventor: Hiroyuki Matsuzaki, Kanagawa, Japan

[73] Assignee: NSK Ltd., Tokyo, Japan

[21] Appl. No.: 897,035

[22] Filed: Jun. 11, 1992

[30] Foreign Application Priority Data

Jun. 12, 1991 [JP] Japan ................... 3-166112

[51] Int. Cl.⁶ .............. G01H 1/08; G01M 13/02; G01N 29/00
[52] U.S. Cl. .................... 73/593; 73/862.59
[58] Field of Search ............ 73/593, 660, 865.3, 73/862.59

[56] References Cited

U.S. PATENT DOCUMENTS

| | | | |
|---|---|---|---|
| 3,201,996 | 8/1965 | Silvia | 73/593 |
| 3,745,815 | 7/1973 | Bentone et al. | 73/593 |
| 4,768,380 | 9/1988 | Vermeiren et al. | 73/593 |
| 5,263,372 | 11/1993 | Matsuzaki et al. | 73/593 |

FOREIGN PATENT DOCUMENTS

| | | |
|---|---|---|
| 3234443 | 7/1983 | Germany . |
| 221687 | 5/1985 | Germany . |
| 3436268 | 4/1986 | Germany . |
| 266848 | 4/1989 | Germany . |

OTHER PUBLICATIONS

Technische Rundschau, 38/90, pp. 118–121, 123.
Company Leaflet No. MT 55 135 DA of FAG Kugelfischer Georg Schä fer KGaA, D–8720 Schweinfurt, pp. 1 and 14.
IEEE Transactions on Industry Applications, vol. IA-20, No. 3, May/Jun. 1984, pp. 519–527.

*Primary Examiner*—Richard E. Chilcot, Jr.
*Assistant Examiner*—William L. Oen
*Attorney, Agent, or Firm*—Evenson, McKeown, Edwards & Lenahan

[57] ABSTRACT

While maintaining an outer ring in a fixed state, an inner ring is rotated. Radial vibrations of the outer ring are detected by a vibration pickup, and detection signals are delivered to a frequency converter via an amplifier. The frequency converter determines, by Fourier transformation, the rotation frequency of the inner ring and the revolution frequency of balls. The processor then calculates the contact angle of a rolling bearing on the basis of these rotation frequency and revolution frequency.

18 Claims, 3 Drawing Sheets

METHOD AND INSTRUMENT FOR MEASURING CONTACT ANGLE OF ROLLING BEARING

BACKGROUND OF THE INVENTION

1. Field of the Invention

The present invention relates to method and instrument for measuring the contact angle of a rolling bearing. These method and instrument are useful for the easy, prompt and accurate determination of the contact angle of rolling elements with an outer raceway and an inner raceway in a rolling bearing.

2. Description of the Related Art

Figure 5:
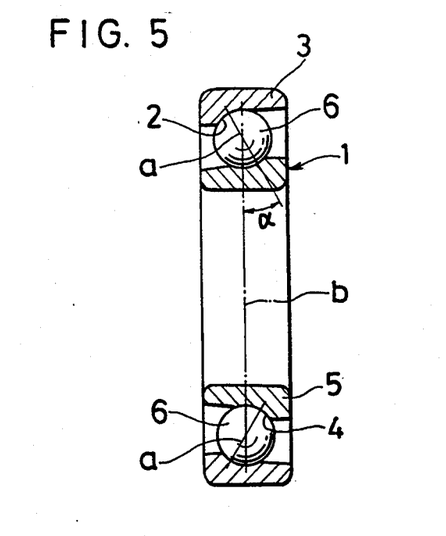
FIG. 5 is a cross-section of one example of a ball bearing.

A variety of rolling bearings such as various ball bearings, for example, an angular ball bearing 1 shown in FIG. 5 or various roller bearings are assembled in bearing portions of various machines and apparatuses. Of these, the ball bearing 1 is constructed of an outer ring 3 having an outer raceway 3 on an inner peripheral wall thereof, an inner ring 5 having an inner raceway 4 on an outer peripheral wall thereof, and plural balls 6 disposed, as one type of rolling elements, for rotation between the outer raceway 2 and the inner raceway 4. Based on rolling of these balls 6, a member, such as a housing, with the outer ring 3 internally fitted thereon and supported thereon and another member, such as a shaft, with the outer ring 5 externally fitted and supported thereon are allowed to rotate relative to each other.

In such a ball bearing 1, a line a extending through the points of contact of each ball 6 with the outer raceway 2 and inner raceway 4 is tilted at an angle $\alpha$ with respect to a line b extending through the center of the ball 6 and the center of the ball 6 located at a position diametrically opposite to the former ball 6, so that the ball bearing 1 can bear not only radial loads but also axial loads. Since the angle $\alpha$ which is called the "contact angle" significantly affects the performance of the ball bearing 1, it is necessary to control the contact angle $\alpha$ at a desired value. In particular, high-performance ball bearings require strict control of the contact angle $\alpha$. Although not illustrated by means of a drawing, the contact angle of rollers as rolling elements in a roller bearing must also be controlled strictly.

As will be described below, it has hence been practiced to determine the above contact angle $\alpha$ from the rotation angle $\theta_i$ of the outer ring 3 or inner ring 5 and the rotation angle $\theta_c$ of a retainer holding the balls 6 thereon [Japanese Patent Publication (Kokoku) No. 51-26824; Japanese Utility Model Application Laid-Open (Kokai) No. 52-143955].

Figure 6:
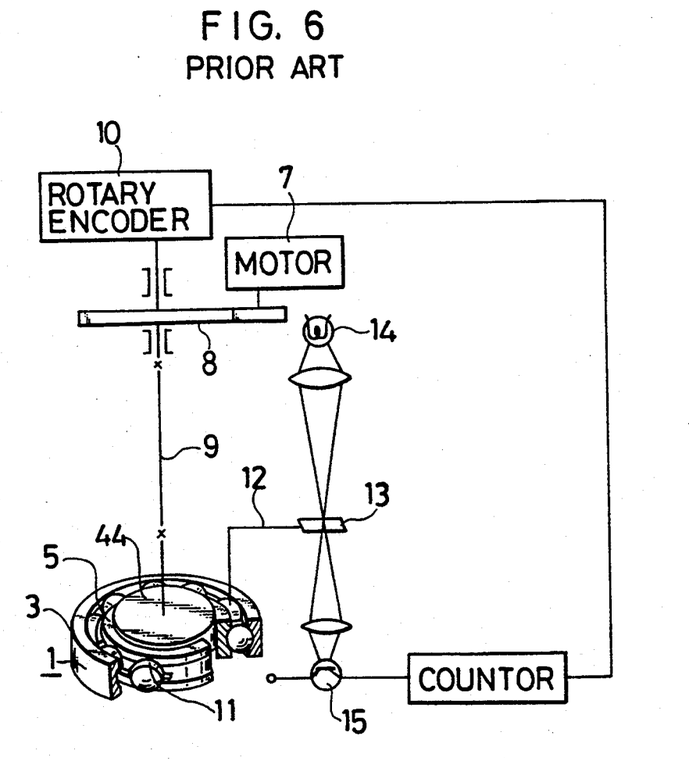
FIG. 6 is a simplified block diagram of a conventional measuring instrument, in which a ball bearing is shown in perspective.

To determine the contact angle $\alpha$ of the ball bearing 1 by the conventional method disclosed in the '824 publication, the determination is conducted as shown in FIG. 6. A drive shaft 9 is rotated by a motor 7 via a gear train 8. A coupling member 44 fixed on one end of the drive shaft 9 is fitted in an opening of the inner ring 5 at one side of the inner ring 5 (i.e., the upper side of the inner ring 5 as viewed in the drawing). Upon energization of the motor 7, the inner ring 5 rotates together with the drive shaft 9 and, at the same time, ! the revolution speed of the drive shaft 9 is detected by a rotary encoder 10 provided on an opposite end of the drive shaft 9. Namely, the rotation angle $\theta_i$ of the inner ring 5 is detected by the rotary encoder 10.

Further, a light-shielding plate 13 is mounted by way of a fixing arm 12 on an annular retainer 11 which rotatably holds the balls 6 (FIG. 5). Upon rotation of the retainer 11, the light-shielding plate 13 crosses between a light-emitting device 14 and a light-receiving device 15, said devices 14 and 15 making up a photoelectric switch. Because the retainer 11 rotates with revolution of the plural balls 6, the rotation angle $\theta_c$ of the retainer 11 with the balls 6 held thereon can be determined depending on how many times the light from the light-emitting device 14 to the light-receiving device 14 is shielded.

The contact angle $\alpha$ is then determined from the thus-determined rotation angles $\theta_i$, $\theta_c$, the outer diameter $D_a$ of the balls 6 and the pitch diameter $d_m$ of the balls 6 in accordance with the below-described formula. Incidentally, the outer diameter $D_a$ of the balls 6 and the pitch diameter $d_m$ of the balls 6 are dimensions which are determined upon manufacture.

$$\theta_c = \theta_i(1 - D_a \cos \alpha/d_m)/2$$

When the contact angle $\alpha$ of a rolling bearing such as ball bearing is determined by such a conventional method as described above, there is a limitation imposed on measurable rolling bearings. Moreover, the conventional method is not only unable to perform high-accuracy measurement but also difficult to permit automated measurement.

The imposition of a limitation on measurable rolling bearings is attributed to the following reasons (1) to (4).

(1) Because of the need for support of the light-shielding plate 13 on the retainer 11 via the fixing arm 12, it is impossible to measure the contact angle of any rolling bearing with a seal provided between the inner peripheral wall of the outer ring 3 and the outer peripheral wall of the inner ring 5.

(2) In a small rolling bearing such as a small-diameter-ball bearing or miniature bearing, it is difficult to mount the fixing arm 12 on the retainer 11 so that measurement is practically impossible.

(3) Measurement is not feasible where a rolling bearing has a structure preventing rotation of the fixing arm 12, for example, the outer ring 3 or inner ring 5 is provided with a flange.

(4) In the case of a rolling bearing assembled in a machine or apparatus, rotation of the fixing arm 12 is often prevented due to an interference between the fixing arm 12 and another structure member or portion, thereby making it impossible to conduct the measurement in many instances.

The unfeasibility of high-accuracy measurement can be attributed to the following reasons (5) to (6).

(5) The revolution angle of the balls 6 is first determined from the rotation angle $\theta_c$ of the retainer 11 on which the balls 6 are held, followed by the determination of the contact angle $\alpha$ from the revolution angle. There is, however, a slight play between the retainer 11 and each ball 6. Because of this slight play, it is impossible to obtain any accurate revolution angle. The contact angle $\alpha$ determined using the revolution angle is, therefore, not accurate.

(6) As a result of the mounting of the fixing arm 12 and light-shielding plate 13 on the retainer 11, the inertial mass of the retainer 11 increases. The plural balls 6 held on the retainer 11, therefore, become susceptible to sliding against the outer raceway 2 and the inner raceway 4. When the balls 6 slide, an error also arises in the measurement value of the contact angle α. This also applies when sliding takes place between the inner ring 5 and the coupling member 44.

On the other hand, the difficulty in automating the measuring work is attributed to the following reasons (7).

(7) The fixing arm 12 must be connected at a basal end portion thereof to the retainer 11 to perform the measuring work. After completion of the measuring work, this fixing arm 12, then, has to be detached from the retainer 11. Such attachment and detachment work of the fixing arm 12 is cumbersome and must be conducted manually. This practically makes it impossible to add a measuring system, such as that shown in FIG. 6, in a manufacturing line for rolling bearings and to inspect the contact angle α of each rolling bearing manufactured through the line.

SUMMARY OF THE INVENTION

An object of this invention is to provide a method for the measurement of the contact angle of a rolling bearing, which method is free of the inconvenience described above.

Another object of this invention is to provide an instrument for the measurement of the contact angle of a rolling bearing, which instrument is free of the inconvenience described above.

In one aspect of this invention, there is thus provided a method for measuring the contact angle of plural rolling elements with an outer raceway and an inner raceway in a rolling bearing, said rolling bearing being composed of an outer ring means having the outer raceway on an inner peripheral wall thereof, an inner ring means having the inner raceway on an outer peripheral wall thereof and the plural rolling elements disposed for rotation between the outer raceway and the inner raceway. While rotating one of the outer ring means and inner ring means with the other ring means being maintained unable to rotate, vibrations of said one ring means or the other ring means are measured. The revolution frequency of the rolling elements is determined from the measurement data of the vibrations. The contact angle of the rolling elements is then determined from the revolution frequency of the rolling elements and the rotation frequency of the other ring means. Preferably, the rotation frequency of the one ring means is determined from the measurement data of the vibrations.

In another aspect of the present invention, there is also provided a method for measuring the contact angle of the rolling elements in one of two angular rows with corresponding one of two outer raceways and corresponding one of two inner raceways in a rolling bearing, said rolling bearing being composed of an outer ring means having the two outer raceways on an inner peripheral wall thereof, an inner ring means having the two inner raceways on an outer peripheral wall thereof, the rolling elements disposed for rotation in said one angular row between the corresponding one of the outer raceways and the corresponding one of the inner raceways, and rolling elements arranged for rotation in the other angular row between the other outer raceway and the other inner raceway. While rotating one of the outer ring means and inner ring means with the other ring means being maintained unable to rotate, vibrations of said one ring means or the other ring means are measured. The rotation frequency of the other ring means and the revolution frequency of the rolling elements in the two angular rows are determined from the measurement data of the vibrations. The one ring means is pushed under varied forces in an axial direction to increase the contact angle of the rolling elements in said one angular row or the other angular row and, at the same time, to reduce the contact angle of the rolling elements in the other angular row, thereby specifying the revolution frequency of the rolling elements in said one angular row or the other angular row. The contact angle of the rolling elements in said one angular row is then determined from the thus-specified revolution frequency and the rotation frequency.

In a further aspect of this invention, there is also provided an instrument for measuring the contact angle of plural rolling elements with an outer raceway and an inner raceway in a rolling bearing, said rolling bearing being composed of an outer ring means having the outer raceway on an inner peripheral wall thereof, an inner ring means having the inner raceway on an outer peripheral wall thereof and the plural rolling elements disposed for rotation between the outer raceway and the inner raceway. The instrument comprises a pusher for pushing one of the outer ring means and inner ring means at a part thereof to make said one ring means unable to rotate, a drive means for rotating the other ring means, a vibration measuring element for measuring vibrations of said one ring means or said the other ring means, a frequency converter for determining the revolution frequency of the rolling elements from an output signal from the vibration measuring element, and a processor for determining the contact angle from the rotation frequency of said the other ring means and the revolution frequency determined by the frequency converter. Preferably, the rotation frequency of the other ring mean is also determined by the frequency converter on the basis of the output signal from the vibration measuring element.

In the above methods and instrument of this invention for the measurement of the contact angle of the rolling elements in the rolling bearing, the revolution frequency of the rolling elements is determined from the measurement date of vibrations of the one ring means or the other ring means. No limitation is therefore imposed on measurable rolling bearings. Moreover, the contact angle can be measured with a sufficiently high degree of accuracy and the measuring work can be automated. These advantages become more apparent especially when the rotation frequency of the other ring means is also determined from the measurement data of the vibrations of the one ring means or the other ring means. Described more specifically, the above methods and instrument of this invention do not impose any limitation in shapes or the way of assembly on measurable rolling bearings, whereby the contact angle of any rolling bearing can be measured. The measuring work is performed without going through the retainer, i.e, without intervention of the retainer, the measurement can be conducted with a sufficiently high degree of accuracy. In addition, it is unnecessary to attach and detach any extra member upon measurement. This facilitates the automation of the measuring work so that the measuring instrument can be added to a manufacturing line for rolling bearings to inspect the contact angles α of all rolling bearings manufactured through the line.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION AND PREFERRED EMBODIMENTS

According to the present invention, the revolution frequency of the rolling elements and, if desired, the rotation frequency of the one ring means are determined from the measurement data of vibrations of the one ring means or the other ring means. The successful determination of the revolution frequency and, if desired, of the rotation frequency is attributed to the following reasons.

A description will first be made of the reasons for the successful determination of the above rotation frequency. Although individual members making up a rolling bearing are finished with extreme accuracy, there is absolutely no case where no error exists in both their surface configurations and dimensions. For example, the outer raceway and the inner raceway are both eccentric relative to the center of rotation of the bearing although the degrees of their eccentricity are very small. Because of this eccentricity, a rotation frequency component is produced. The rotation frequency can therefore be determined by measuring any one of radial vibrations, angular vibrations and axial vibrations of the rotating ring as the other ring means or of the fixed ring as the one ring means.

A description will next be made of the reasons for the successful determination of the revolution frequency. Although plural rolling elements assembled in a single rolling bearing are assumed to have the same diameter, the outer diameter slightly differs from one rolling element to another due to an unavoidable manufacturing error. Based of revolution of plural rolling elements whose outer diameters slightly differ from one another as mentioned above, the one ring means or the other ring means vibrates in a radial direction, angular direction or axial direction. The frequency of these vibrations coincides with the revolution frequency of the rolling elements or with an integer multiple of the revolution frequency of the rolling elements. Further, the outer raceway and inner raceway both undergo small meandering. During rotation of the other ring means, the one ring means or the other ring means vibrates in the radial direction, angular direction or axial direction due to the meandering. The frequency of these vibrations therefore contains the revolution frequency component of the rolling elements. The revolution frequency of the rolling elements can, therefore, be determined once the frequency of radial, angular or axial vibrations of the one ring means or the other ring means is obtained.

After the rotation frequency $f_r$ of the other ring means and the revolution frequency $f_c$ of the balls have been determined on the basis of the radial vibrations of the other ring means as described above, the contact angle is determined using the following formulae (1) and (2) or formulae (3) and (4) to be described later.

$$f_c = f_r(d_m - D_a \cos \alpha)/2d_m \tag{1}$$

The formula (1) can be rewritten into the following formula (2):

$$\alpha = \cos^{-1}[d_m\{1-(2f_c/f_r)\}/D_a] \tag{2}$$

In the methods and instrument of this invention for the measurement of the contact angle of a rolling bearing, it is no longer required to attach any extra part or the like, such as the light-shielding plate, to the rolling bearing upon conducting the measuring work. Accordingly, no limitation is imposed on measurable rolling bearings and automation of the measuring work is facilitated. Further, the measurement can be conducted with a sufficiently high degree of accuracy because the revolution frequency of the rolling elements is determined without intervention of the retainer.

The first to third embodiments of the present invention will hereinafter be described with reference to FIG. 1 to FIG. 4 of the accompanying drawings.

Figure 1:
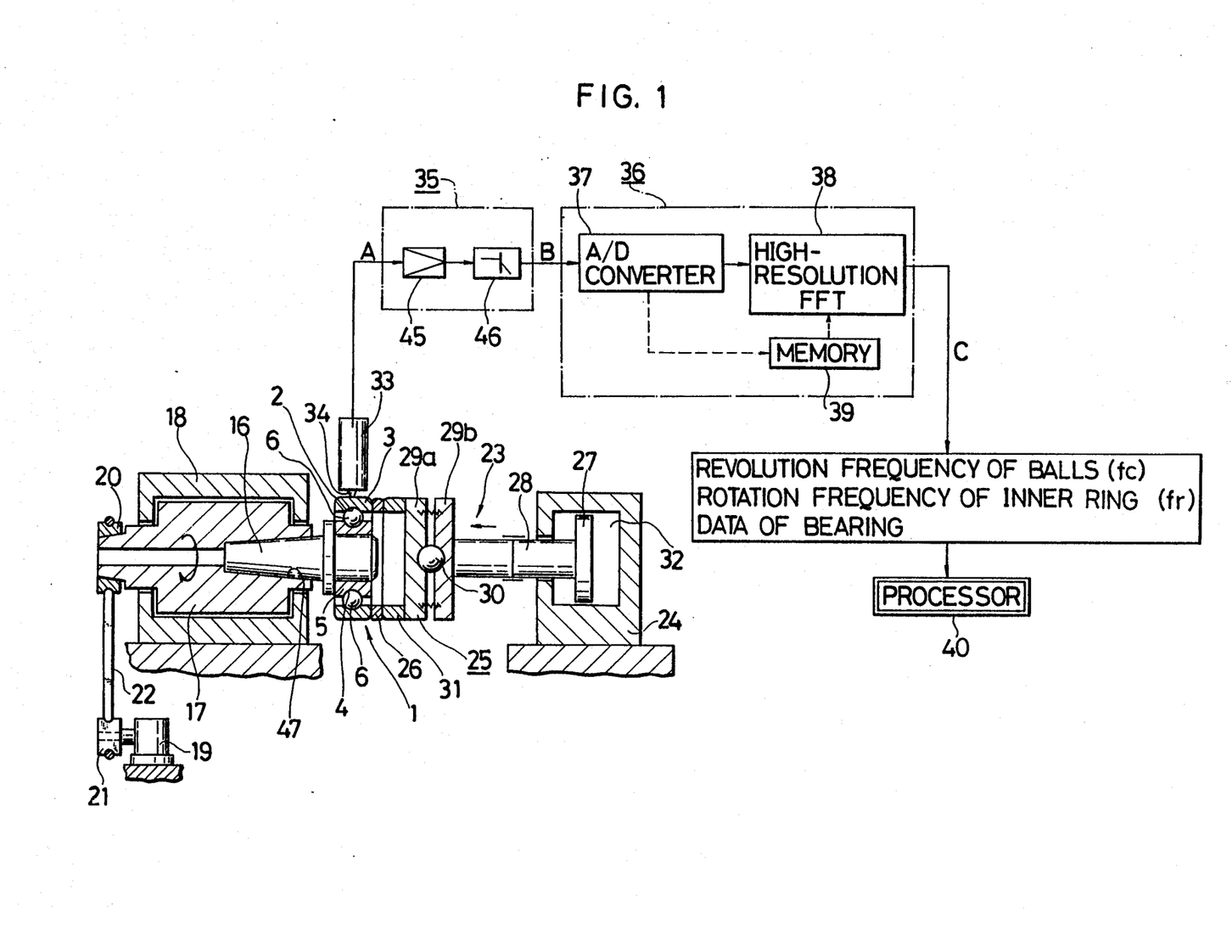
FIG. 1 is a simplified block diagram of a first embodiment of this invention.

FIG. 1 shows the first embodiment of the instrument according to this invention. A ball bearing 1, one type of rolling bearing, whose contact angle $\alpha$ is to be measured, is constructed of an outer ring 3 having an outer raceway 2 on an inner peripheral wall thereof, an inner ring 5 having an inner raceway 4 on an outer peripheral wall thereof, and plural balls 6 rotatably disposed as one type of rolling elements between the outer raceway 2 and the inner raceway 4. Upon measurement of its contact angle $\alpha$, the inner ring 5 of the ball bearing 1 is externally fitted and supported on an arbor 16 which, in combination with a spindle 17, an electric motor 19 and the like to be described herein, constitutes a drive unit.

The arbor 16 is fixedly fitted in a tapered bore 47 formed centrally in one end portion (the right-hand end portion as viewed in FIG. 1) of the spindle 17. The spindle 17 is in turn supported for rotation inside a journal bearing 18. As the journal bearing 18, it is preferable to use a bearing of a structure not producing vibrations upon rotation of the spindle 17, such as a static pressure gas bearing, magnetic bearing or superconductive bearing.

The spindle 17 supported on the journal bearing 18 as described above can be driven and rotated by the electric motor 19. In the illustrated embodiment, a belt 22 passes around a driven pulley 20, which is fixed on an opposite end portion of the spindle 17, and also a drive pulley 21 fixed on an output shaft of the electric motor 19. Upon energization of the electric motor 19, the spindle 17 is driven at a constant speed, for example, at about 1,800 rpm.

By setting the tension of the belt 22 at a suitable level and also choosing an adequate material for the belt 22, the spindle 17 can be preventing from producing vibrations during rotation of the spindle 17 by the electric motor 19. Different from the illustrated embodiment, it is possible to concentrically arrange the spindle 17 and the output shaft of the electric motor 19 and to drive and rotate the spindle 17 by way of a magnet coupling or the like.

A pusher 23 is disposed in opposite to an end face of the outer ring 3 of the ball bearing 1 supported on the arbor 16. This pusher 23 has a pressure cylinder 24, a rocker coupling 25 and a push ring 26. A basal end portion of a rod 28 is fixed on a pressuring piston 27 which is fitted in the pressure cylinder 24. The rocker coupling 25 is connected to a free end portion of the rod 28. The rocker coupling 25 is composed of two plates 29a,29b and a ball 30 held between the plates 29a,29b, so that the plates 29a,29b are rockingly displaceable relative to each other.

The push ring 26 is supported on a side wall of the plate 29a, which is the plate facing the ball bearing 1 (i.e., the left-hand plate as viewed in FIG. 1), with a damper 31 interposed therebetween. As working fluid is fed into a cylinder compartment 32 of the pressure cylinder 24, the push ring 26 is caused to move leftward as viewed in FIG. 1 and is pressed against the end face of the outer ring 3 of the ball bearing 1, so that the pusher ring 26 presses the outer ring 3 in the axial direction (i.e., the leftward direction as viewed in FIG. 1). By this pressing operation, the outer ring 3 is prevented from rotation even when the inner ring 5 is rotated as a result of energization of the electric motor 19.

The rocker coupling 25 serves to press the pusher ring 26 under equal force over the entire periphery thereof against the end face of the outer ring 3 during the above pressing operation. The damper 31 prevents transmission of vibrations, which are produced at the pressure cylinder 24 or the rocker coupling 25, to the outer ring 3. As the means for pressing the pusher ring 26 in the axial direction, another mechanism such as solenoid can be used in place of the pressure cylinder 24.

A probe 34 of a vibration measuring element such as a vibration pickup 33 is maintained in contact with an outer peripheral wall of the outer ring 3. The vibration pickup 33 measures radial vibrations of the outer ring 3 and sends a signal A indicative of measurement data to an amplifier unit 35. As the vibration measuring element, any other device or element can be used as long as it can detect such radial vibrations. Examples of other devices include a displacement gauge, a speedometer and an accelerometer.

The amplifier unit 35 includes an amplifier 45 and a low-pass filter 46. An amplifier-signal B is therefore outputted from the amplifier unit 35 to a frequency converter 36. The low-pass filter 46 is provided to avoid any reversal of the signal flow when processing is performed by a Fourier transformer 38 as will be described next.

The frequency converter 36 includes an A/D converter 37, the Fourier transformer 38 and a memory 39. Based on the signal B fed from the amplifier unit 35 and converted to a digital signal by the A/D converter 37, the Fourier transformer 38 determines the rotation frequency $F_r$ of the inner ring 5 and the revolution frequency $f_c$ of the plural balls 6 by using fast Fourier transform (FFT).

Incidentally, the memory 39 is used to make a correction when there is a potential problem of occurrence of irregularity in the rotation of the inner ring 5 by the electric motor 19. To correct such irregularity in rotation, a signal outputted from the A/D converter 37 is delivered to the Fourier transformer 38 by way of the memory 39. The Fourier transformer 38 then determines the rotation frequency $f_r$ and revolution frequency $f_c$ from data on the same time base.

Namely, the signal b sent to the frequency converter 36 from the amplifier unit 35 contains a signal associated with the rotation frequency $f_r$ and another signal associated with the revolution frequency $f_c$ in a mutually overlapped fashion. To have these overlapped signals processed at the same time by the frequency converter 36, the construction of the frequency converter 36 becomes unavoidably complex and expensive. In the present embodiment, therefore, the frequency converter 36 is designed to perform the processing of the signal associated with the rotation frequency $f_r$ and the signal associated with the revolution frequency $f_c$ successively, one after the other.

Where the rotation of the inner ring 5 is free of irregularity, it is possible to perform the processing of the signal associated with the rotation frequency $f_r$ on the basis of a signal B received during the period of from $T_1$ to $T_2$ and the processing of the signal associated with the revolution frequency $f_c$ on the basis of a signal B' received during the period of from $T_3$ to $T_4$, the latter period not overlapping with the former period (the memory 39 is not needed). If there is irregularity in the rotation of the inner ring 5, the rotation frequency $f_r$ during the period of from $T_1$ to $T_2$ no longer corresponds to the revolution frequency $f_c$ during the period of from $T_3$ to $T_4$. As a result, the resulting contact angle $\alpha$ becomes inaccurate. In such a case, the memory 39 is therefore used so that the rotation frequency $f_r$ and the revolution frequency $f_c$ can both be determined from a signal present on the same time base (for example, from the signal B received during the period of from $T_1$ to $T_2$).

Even if irregularity occurs in the rotation of the inner ring 5, this irregularity therefore no longer affects the ratio $f_c/f_r$ of the revolution frequency $f_c$ to the rotation frequency $f_r$. Since the contact angle $\alpha$ to be determined eventually is determined from the ratio of the revolution frequency $f_c$ to the rotation frequency $f_r$ as is apparent from the formula (2), the contact angle $\alpha$ can be determined accurately as long as this ratio is correct.

A signal C, which has been determined by the Fourier transformer 38 constituting the frequency converter 36 and indicates the rotation frequency $f_r$ of the inner ring 5 and the revolution frequency $f_c$ of the balls 6, is then inputted to a processor 40 such as a personal computer together with signals indicative of the outer diameter $D_a$ of the balls 6 and the pitch diameter $d_m$ of the balls 6. The processor 40 then determines the contact angle $\alpha$ of the ball bearing 1 in accordance with the formula (2).

The second embodiment of the present invention will next be described with reference to FIG. 2. As opposed to the above-described first embodiment in which, upon measurement, the inner ring 5 is rotated while fixing the outer ring 3, a shaft 41 as an inner ring means is fixed and, instead, the outer ring 3 is rotated in this embodiment. Reflecting this difference, a cylindrical portion 42 is formed in a free end portion of an arbor 16 and the outer ring is internally fitted and fixed in the cylindrical portion 42.

A pushing end block 43 is fixed on the damper 31 which constitutes the pusher 23 (see FIG. 1). By the pushing end block 43, the shaft 41 is centrally pressed.

The probe 34 of the vibration pickup 33 is maintained in contact with an outer peripheral wall of a portion of the shaft 41, which portion protrudes from the outer ring 3.

In the second embodiment, the contact angle α of the ball bearing 1 is also determined from the rotation frequency $f_r$ of the outer ring 3 and the revolution frequency $f_c$ of the balls 6, said frequencies $f_r$ and $f_c$ having been determined from the measurement data of the vibration pickup 33, the outer diameter $D_a$ of the balls 6 and the pitch diameter $d_m$ of the balls 6. When the outer ring 3 is rotated, however, the contact angle α is determined in accordance with the following formulae (3) and (4) rather than the formulae (1) and (2) described above.

$$f_c = f_r(d_m - D_a \cos\alpha)/2d_m \quad (3)$$

$$\alpha = \cos^{-1}[d_m\{2f_c/f_r\} - 1\}/D_a] \quad (4)$$

The third embodiment of this invention will next be described with reference to FIG. 3. In the case of a bearing like a hub unit bearing for rotatably supporting a wheel of an automotive vehicle, two raceways are formed on each of an inner peripheral wall of an outer ring 3 and an outer peripheral wall of an inner ring 41 as an inner ring means. Balls 6, which are disposed between the raceways on the inner peripheral wall of the outer ring 3 and the corresponding raceways on the outer peripheral wall of the inner ring 41, respectively, are preloaded. In this case, radial vibrations produced by the balls in one of the two angular rows are different from those produced by the balls in the other angular row. Accordingly, two revolution frequencies $f_c$ are obtained.

If the contact angle e of the balls in each angular row is predictable, it is possible to find out which revolution frequency $f_c$ is for which angular row. If not predictable, for example, if the contact angles α of the balls in the respective angular rows are substantially the same, the force under which the outer ring 3 (the end face of the shaft 41 where the shaft is fixed as in FIG. 2) is pressed by the push ring 26 is varied. When the pressing force is increased, for example, the contact angle α of the balls in the right-hand angular row as viewed in FIG. 3 becomes greater whereas the contact angle α of the balls in the left-hand angular row becomes smaller. At the same time, one of the above-described two revolution frequencies $f_c$ becomes higher and the other revolution frequency becomes lower.

Observation of the above-described two revolution frequencies under varied pressing forces, therefore, makes it possible to specify which one of two determined revolution frequencies $f_c$ is for which one of the two angular rows. From the revolution frequency $f_c$ so specified and the rotation frequency $f_r$, the contact angle α of the balls in said one angular row can then be determined.

In each of the above embodiments, the accuracy of the contact angle α so determined is affected by the resolution of the Fourier transformer 38. To increase the accuracy of the contact angle α so determined, it is preferable to use, as the Fourier transformer 38, a high-resolution Fourier transformer such as a zoom Fourier transformer. Through trial calculations, the present inventor studied any possible relationship between varied frequency resolutions and the accuracy of the corresponding resultant contact angles α. The results are diagrammatically illustrated in FIG. 4.

Figure 4:
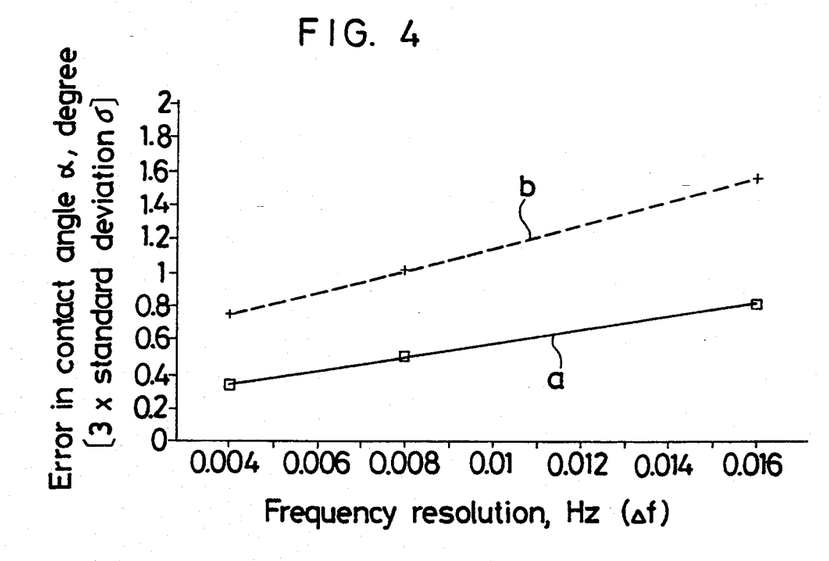
FIG. 4 is a diagrammatic representation of a relationship between frequency resolutions and measurement errors in contact angle.

In FIG. 4, resolutions Δf of the Fourier transformer 38 are plotted in terms of frequency (Hz) along the axis of abscissas while errors (°) in the contact angle α are plotted in terms of the threefold (3ρ) of standard deviation (ρ) along the axis of ordinates.

Figure 3:
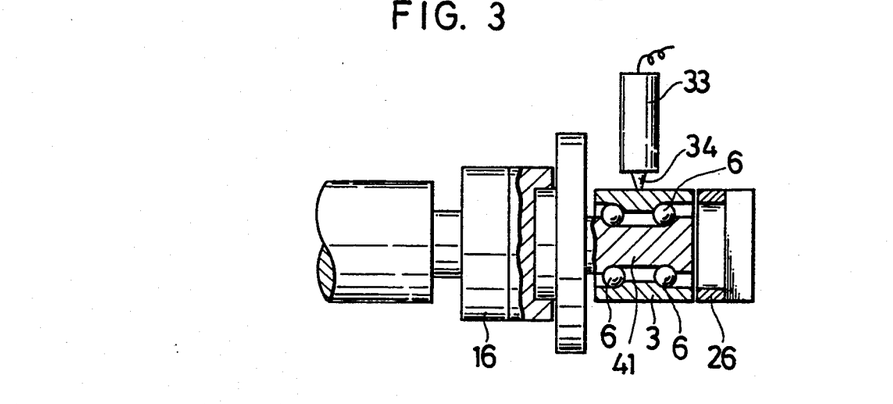
FIG. 3 is a fragmentary schematic cross-section of a third embodiment of this invention.

Incidentally, the solid line a indicates the results of a trial calculation for the measurement of a bearing in which, as shown in FIG. 3, two raceways are formed on each of the inner peripheral wall of the outer ring 3 and an outer peripheral wall of an inner ring means such as the shaft 41 and the balls 6 disposed between the raceways on the inner peripheral wall of the outer ring 3 and the corresponding raceways on the outer peripheral wall of the inner ring means, respectively, are preloaded (ball outer diameter $D_a$: 2.000±0.0015 mm, ball pitch diameter $d_m$: 6.900±0.005 mm). As prerequisites for obtaining the solid line a, the rotation frequency $f_r$ of the outer ring 3 and the revolution frequency $f_c$ of the balls 6 were assumed to be 30,000 ±Δf and 19,000 ±Δf', respectively.

Figure 2:
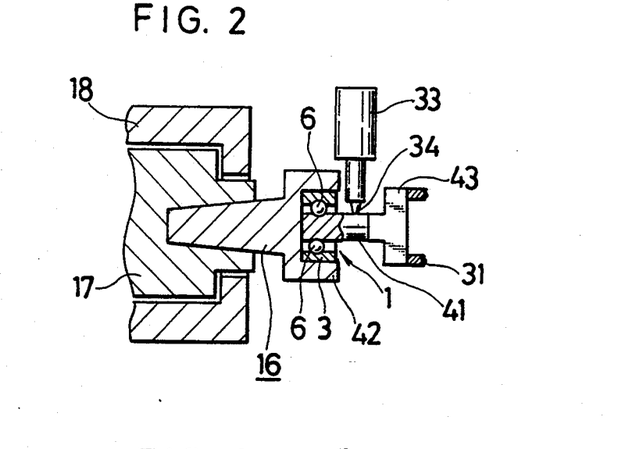
FIG. 2 is a fragmentary schematic cross-section of a second embodiment of this invention.

On the other hand, the dashed line b indicates the results of a trial calculation for the measurement of a single-row deep-groove ball bearing as shown in FIGS. 1–2 (ball outer diameter $D_a$: 6.74875±0.010 mm, ball pitch diameter $d_m$: 29.000±0.010 mm). As prerequisites for obtaining the dashed line b, the inner ring 5 and the balls 6 were assumed to be rotated at the rotation frequency $f_r = 30,000\pm\Delta f$ and the revolution frequency $f_c = 11,600\pm\Delta f'$, respectively, upon measurement.

As is also clearly envisaged from FIG. 4, the contact angle α of a rolling bearing such as the ball bearing 1 can be determined with good accuracy when the method and instrument according to the present invention are employed.

In each of the above embodiments, radial vibrations of the outer ring 3 or shaft 41 on the nonrotated, i.e., fixed side are measured to determine the rotation frequency $f_r$ and revolution frequency $f_c$. However, the rotation frequency $f_r$ and the revolution frequency $f_c$ can also be determined by measuring the vibrations of the inner ring 5 or outer ring 3 on the rotated side. Further, the rotation frequency $f_r$ and revolution frequency $f_c$ can be determined not only from the radial vibrations but also from angular vibrations or axial vibrations. For the measurement of angular vibrations, it is necessary to maintain the probe 34 of the vibration pickup 33 in oblique contact with a corner portion of a member whose vibrations are to be measured. To measure axial vibrations, it is necessary to maintain the probe 34 in axial contact with an end face of a member to be measured.

In each of the above embodiments, the rotation frequency of the outer ring as an outer ring means or of the shaft as an inner ring means can also be determined by directing measuring the rotation frequency $f_r$ of the spindle. This can be practiced by modifying the instrument of FIG. 1, for example, by applying a speedometer to the spindle 17 at a point between the driven pulley 20 and the journal bearing 18 and feeding its detection signal to the amplifier 45.

The present invention has been described above, centering around the measurement of the contact angles of ball bearings. It is to be noted that the methods and instrument of this invention for the measurement of the contact angle of a rolling bearing can also be applied upon measurement of the contact angles of roller bearings, including tapered roller bearings.

What is claimed is:

1. In a method for measuring the contact angle of plural rolling elements with an outer raceway and an inner raceway in a rolling bearing, said rolling bearing being composed of an outer ring having the outer raceway on an inner peripheral wall thereof, an inner ring having the inner raceway on an outer peripheral wall thereof and the plural rolling elements disposed for rotation between the outer raceway and the inner raceway, the improvement wherein while rotating one of the outer ring and inner ring with the other ring being maintained unable to rotate, vibrations of said one ring or the other ring are measured, the revolution frequency of the rolling elements is determined from the measurement data of the vibrations, and the contact angle of the rolling elements is then determined from the revolution frequency of the rolling elements and the rotation frequency of the one ring.

2. The method of claim 1, wherein the rotation frequency of the one ring is determined from the measurement data of the vibrations.

3. In a method for measuring the contact angle of the rolling elements in one of two angular rows with corresponding one of two outer raceways and corresponding one of two inner raceways in a rolling bearing, said rolling bearing being composed of an outer ring having the two outer raceways on an inner peripheral wall thereof, an inner ring having the two inner raceways on an outer peripheral wall thereof, the rolling elements disposed for rotation in said one angular row between the corresponding one of the outer raceways and the corresponding one of the inner raceways, and rolling elements arranged for rotation in the other angular row between the other outer raceway and the other inner raceway, characterized in that while rotating one of the outer ring and inner ring with the other ring being maintained unable to rotate, vibrations of said one ring or the other ring are measured, the rotation frequency of the other ring and the revolution frequency of the rolling elements in the two angular rows are determined from the measurement data of the vibrations, said one ring is pushed under varied forces in an axial direction to increase the contact angle of the rolling elements in said one angular row or the other angular row and, at the same time, to reduce the contact angle of the rolling elements in the other angular row, thereby specifying the revolution frequency of the rolling elements in said one angular row or the other angular row, and the contact angle of the rolling elements in said one angular row is then determined from the thus-specified revolution frequency and the rotation frequency.

4. In an instrument for measuring the contact angle of plural rolling elements with an outer raceway and an inner raceway in a rolling bearing, said rolling bearing being composed of an outer ring having the outer raceway on an inner peripheral wall thereof, an inner ring having the inner raceway on an outer peripheral wall thereof and the plural rolling elements disposed for rotation between the outer raceway and the inner raceway, characterized in that said instrument comprises a pusher for pushing one of the outer ring and inner ring at a part thereof to make said one ring unable to rotate, a drive means for rotating the other ring, a vibration measuring element for measuring vibrations of said one ring or said the other ring, a frequency converter for determining the revolution frequency of the rolling elements from an output signal from the vibration measuring element, and a processor for determining the contact angle from the rotation frequency of said the other ring and the revolution frequency determined by the frequency converter.

5. The instrument of claim 4, wherein the rotation frequency of the other ring is also determined by the frequency converter on the basis of the output signal from the vibration measuring element.

6. The instrument of claim 4, wherein the pusher is equipped with a rocker coupling composed of two plates and a ball held between the two plates, and the pusher pushes said one ring at the part thereof via the rocker coupling.

7. The instrument of claim 4, wherein the pusher is equipped with a damper to prevent transmission of vibrations to said one ring.

8. The instrument of claim 4, wherein the drive means defines a tapered bore and is supported on the rolling bearing via an arbor fixedly fitted in the tapered bore.

9. The instrument of claim 4, wherein the frequency converter comprises an A/D converter, a high-resolution Fourier transformer and a memory and, when there is a potential problem of occurrence of irregularity in the rotation of the other ring means by the drive, an output signal from the A/D converter is fed to the Fourier transformer via the memory.

10. A method for measuring the contact angle of plural rolling elements with an outer raceway and an inner raceway in a rolling bearing, said rolling bearing being composed of an outer member having the outer raceway on an inner peripheral wall thereof, an inner member having the inner raceway on an outer peripheral wall thereof and disposed for rotation relative to the outer member and the plural rolling elements disposed between the outer raceway and the inner raceway and maintained in contact with the outer and inner raceways with the contact angle defined therebetween, which comprises:
   rotating one of the outer and inner members with the other member being maintained unable to rotate;
   measuring vibrations of at least one of the outer and inner members;
   determining, from the vibrations so measured, the frequency of revolutions of the rolling elements about a central axis of the other member maintained unable to rotate; and
   determining the contact angle of the rolling elements from the revolution frequency of the rolling elements and the rotation frequency of the rotated one of the outer and inner members.

11. An instrument for measuring the contact angle of plural rolling elements with an outer raceway and an inner raceway in a rolling bearing, said rolling bearing being composed of an outer member having the outer raceway on an inner peripheral wall thereof, an inner member having the inner raceway on an outer peripheral wall thereof and disposed for rotation relative to the outer member and the plural rolling elements disposed between the outer raceway and the inner raceway and maintained in contact with the outer and inner raceways with the contact angle defined therebetween, which comprises:
   means for maintaining one of the outer and inner members unable to rotate;
   means for rotating the other of the outer and inner members;
   means for measuring vibrations of at least one of the outer and inner members;
   a frequency converter for determining, from the vibrations so measured, the frequency of revolutions of the rolling elements about a central axis of the other member maintained unable to rotate; and a processor for determining the contact angle from the rotation frequency of the rotated one of the outer and inner members and the revolution frequency of the rolling elements.

12. A method for measuring the contact angle of plural rolling elements with an outer raceway and an inner raceway in a rolling bearing, said rolling bearing being composed of an outer member having the outer raceway on an inner peripheral wall thereof, an inner member having the inner raceway on an outer peripheral wall thereof and disposed for rotation relative to the outer member and the plural rolling elements disposed between the outer raceway and the inner raceway and maintained in contact with the outer and inner raceways with the contact angle defined therebetween, which comprises:

rotating one of the outer member and the inner member relative to the other of said members;

measuring vibrations of at least one of the outer and inner members;

determining, from the vibrations so measured, the frequency of revolutions of the rolling elements about a common central axis of the inner and outer raceways; and determining the contact angle of the rolling elements from the revolution frequency of the rolling elements and the rotation frequency of the rolling bearing.

13. An instrument for measuring the contact angle of plural rolling elements with an outer raceway and an inner raceway in a rolling bearing being composed of an outer member having the outer raceway on an inner peripheral wall thereof, an inner member having the inner raceway on an outer peripheral wall thereof and disposed for rotation relative to the outer member and the plural rolling elements disposed between the outer raceway and the inner raceway and maintained in contact with the outer and inner raceways with the contact angle defined therebetween, which comprises:

for rotating one of the outer member and the inner member relative to the other of said members;

equipment for measuring vibrations of at least one of the outer and inner members;

a frequency converter equipment for determining, from the vibrations so measured, the frequency of revolutions of the rolling elements about a common central axis of the inner and outer raceways; and a processor for determining the contact angle from the rotation frequency of the rolling bearing and the revolution frequency of the rolling elements.

14. A method for measuring the first contact angle of a first row of rolling elements with a first outer raceway and a first inner raceway and the second contact angle of a second row of rolling elements with a second outer raceway and a second inner raceway in a rolling bearing, said rolling bearing being composed of an outer member having the first and second outer raceways on an inner peripheral wall thereof, an inner member having the first and second inner raceways on an outer peripheral wall thereof and disposed for rotation relative to the outer member, the first row of rolling elements disposed between the first outer raceway and the first inner raceway and maintained in contact with the first outer and inner raceways with the first contact angle defined therebetween and the second row of rolling elements disposed between the second outer raceway and the second inner raceway and maintained in contact with the second outer and inner raceways with the second contact angle defined therebetween, which comprises: rotating one of the outer and inner members with the other member being maintained unable to rotate;

measuring vibrations of at least one of the outer and inner members;

determining, from the vibrations so measured, the frequencies of revolutions of the rolling elements in the two rows about a central axis of the other member maintained unable to rotate;

applying axial force to the outer or inner member;

specifying the revolution frequency of the rolling elements in the first row and that of the rolling elements in the second row from changes in the revolution frequencies of the rolling elements in the two rows caused by the axial force so applied; and determining the first and second contact angles from the revolution frequencies of the rolling elements in the first and second rows and the rotation frequency of the rotated one of the outer and inner members.

15. An instrument for measuring the first contact angle of a first row of rolling elements with a first outer raceway and a first inner raceway and the second contact angle of a second row of rolling elements with a second outer raceway and a second inner raceway in a rolling bearing/said rolling bearing being composed of an outer member having the first and second outer raceways on an inner peripheral wall thereof, an inner member having the first and second inner raceways on an outer peripheral wall thereof and disposed for rotation relative to the outer member, the first row of rolling elements disposed between the first outer raceway and the first inner raceway and maintained in contact with the first outer and inner raceways with the first contact angle defined therebetween and the second row of rolling elements disposed between the second outer raceway and the second inner raceway and maintained in contact with the second outer and inner raceways with the second contact angle defined therebetween, which comprises:

means for maintaining one of the outer and inner members unable to rotate;

means for rotating the other of the outer and inner members;

means for applying axial force to one of the outer and inner members;

means for measuring vibrations of at least one of the outer and inner members;

a frequency converter for determining, from the vibrations so measured, the frequencies of revolutions of the rolling elements in the two rows about a central axis of the one member maintained unable to rotate and then specifying the revolution frequency of the rolling elements in the first row and that of the rolling elements in the second row from changes in the revolution frequencies of the rolling elements in the two rows caused by the axial force so applied; and a process for determining the first and second contact angles from the revolution frequencies of the rolling elements in the first and second rows and the rotation frequency of the rotated one of the outer and inner members.

16. A method for measuring the contact angle of plural rolling elements with an outer raceway and an inner raceway in a rolling bearing, said rolling bearing being composed of an outer member having the outer raceway on an inner peripheral wall thereof, an inner member having the inner raceway on an outer peripheral wall thereof and disposed for rotation relative to the outer member and the plural rolling elements disposed between the outer raceway and the inner raceway and maintained in contact with the outer and inner raceways with the contact angle defined therebetween, which comprises:

rotating one of the outer and inner members with the other member being maintained unable to rotate;

measuring vibrations of at least one of the outer and inner members;

determining the frequency of rotations of the rotated one of the outer and inner members and, from the vibrations so measured, the frequency of revolutions of the rolling elements about central axis of the other member maintained unable to rotate; and     determining the contact angle of the rolling elements from the revolution frequency of the rolling elements and the rotation frequency of the rotated one of the outer and inner members.

17. A method for measuring the contact angle ($\alpha$) of plural rolling elements with a first raceway and a second raceway in a rolling bearing, said rolling bearing being composed of a first member having the first raceway on a first peripheral wall thereof, a second member having the second raceway on a second peripheral wall thereof, said first and second peripheral walls having a common central axis and being disposed in a mutually opposed relationship for rotation relative to each other, and the plural rolling elements disposed between the first raceway and the second raceway and maintained in contact with the first and second raceways with the contact angle defined therebetween, which comprises:

rotating the second member with the first member being maintained unable to rotate;

measuring vibrations of at least one of the first and second members;

determining, from the vibrations so measured, the frequency ($f_c$) of revolutions of the rolling elements about the central axis of the first member maintained unable to rotate; and     determining the contact angle ($\alpha$) of the rolling elements from the revolution frequency ($f_c$) of the rolling elements and the rotation frequency ($f_c$) of the second member.

18. An instrument for measuring the contact angle ($\alpha$) of plural rolling elements with a first raceway and a second raceway in a rolling bearing, said rolling bearing being composed of a first member having the first raceway on a first peripheral wall thereof, a second member having the second raceway on a second peripheral wall thereof, said first and second peripheral walls having a common central axis and being disposed in a mutually opposed relationship for rotation relative to each other, and the plural rolling elements disposed between the first raceway and the second raceway and maintained in contact with the first and second raceways with the contact angle defined therebetween, which comprises:

equipment for maintaining the first member unable to rotate;

equipment for rotating the second member;

equipment for measuring vibrations of at least one of the first and second members;

a frequency converter for determining, from the vibrations so measured, the frequency ($f_c$) of revolutions of the rolling elements about the central axis of the first member maintained unable to rotate; and     a processor for determining the contact angle ($\alpha$) from the rotation frequency ($f_r$) of the rotating second member (5;41) about the central axis of the first member maintained unable to rotate and the revolution frequency ($f_c$) of the rolling elements about the central axis of the first member maintained unable to rotate.

* * * * *